US012036563B2

(12) United States Patent
Booher et al.

(10) Patent No.: US 12,036,563 B2
(45) Date of Patent: Jul. 16, 2024

(54) PROCESS FOR SEPARATING MIXTURES OF SOLIDS

(71) Applicant: SOLVAY SPECIALTY POLYMERS USA, LLC, Alpharetta, GA (US)

(72) Inventors: Matthew Booher, Canton, GA (US); Joel Pollino, Johns Creek, GA (US); Keshav S. Gautam, Suwanee, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 309 days.

(21) Appl. No.: 17/427,254

(22) PCT Filed: Jan. 31, 2020

(86) PCT No.: PCT/EP2020/052462
§ 371 (c)(1),
(2) Date: Jul. 30, 2021

(87) PCT Pub. No.: WO2020/157294
PCT Pub. Date: Aug. 6, 2020

(65) Prior Publication Data
US 2022/0118464 A1   Apr. 21, 2022

Related U.S. Application Data

(60) Provisional application No. 62/799,831, filed on Feb. 1, 2019.

(30) Foreign Application Priority Data

Mar. 13, 2019 (EP) ...................... 19162690

(51) Int. Cl.
| | |
|---|---|
| *B03D 1/16* | (2006.01) |
| *B03D 1/004* | (2006.01) |
| *B03D 1/016* | (2006.01) |
| *B03D 1/10* | (2006.01) |
| *B29B 17/02* | (2006.01) |
| *C08J 11/08* | (2006.01) |
| *B29K 71/00* | (2006.01) |
| *B29K 77/00* | (2006.01) |
| *B29K 81/00* | (2006.01) |

(52) U.S. Cl.
CPC ........... *B03D 1/016* (2013.01); *B03D 1/0043* (2013.01); *B03D 1/10* (2013.01); *B29B 17/02* (2013.01); *C08J 11/08* (2013.01); *B29B 2017/0244* (2013.01); *B29K 2071/00* (2013.01); *B29K 2077/00* (2013.01); *B29K 2081/06* (2013.01); *C08J 2371/10* (2013.01); *C08J 2381/06* (2013.01)

(58) Field of Classification Search
CPC ........ B03D 1/016; B03D 1/0043; B03D 1/10; B03B 5/30; B29B 17/02; C08J 11/08
USPC ...................... 209/172, 172.5, 175
See application file for complete search history.

(56) References Cited

U.S. PATENT DOCUMENTS

| | | | | |
|---|---|---|---|---|
| 3,802,632 | A * | 4/1974 | Dancy ...................... | B03D 1/02 209/729 |
| 4,178,231 | A * | 12/1979 | Smith ................ | B01D 11/0207 299/8 |
| 5,085,785 | A * | 2/1992 | Reeves ..................... | B03B 5/30 210/776 |
| 6,460,788 | B1 * | 10/2002 | de Feraudy ............. | B29B 17/02 241/20 |
| 7,128,133 | B2 | 10/2006 | Costello et al. | |
| 7,497,335 | B2 * | 3/2009 | Bork ....................... | B29B 17/04 209/172.5 |
| 2007/0131535 | A1 * | 6/2007 | Shiflett ................... | C07B 63/00 203/99 |
| 2007/0272597 | A1 * | 11/2007 | De Feraudy ............ | B29B 17/02 209/724 |

FOREIGN PATENT DOCUMENTS

| | | |
|---|---|---|
| DE | 3800204 A1 | 7/1989 |
| DE | 293742 A5 | 9/1991 |
| WO | 1983002281 A1 | 7/1983 |

* cited by examiner

*Primary Examiner* — Joseph C Rodriguez
(74) *Attorney, Agent, or Firm* — Osha Bergman Watanabe & Burton LLP

(57) ABSTRACT

The invention pertains to a process for separating mixtures of solids based on their densities. The present invention also relates to the use of a separating liquid (L) for separating plastic solids from metal-containing solids based on their densities, wherein the separating liquid (L) has a density d3 such that 1.5<d3<2.0; wherein the solids have a particle size ranging from 0.1 to 100 mm. The separating liquid (L) is preferably a fluorinated fluid.

11 Claims, No Drawings

PROCESS FOR SEPARATING MIXTURES OF SOLIDS

RELATED APPLICATIONS

This application is a U.S. national phase entry under 35 U.S.C. § 371 of International Application No. PCT/EP2020/052462, filed on Jan. 31, 2020, which claims priority to U.S. Application No. 62/799,831 filed on Feb. 1, 2019 and to European Application No. 19162690.2 filed on Mar. 13, 2019. The entire contents of these applications are explicitly incorporated herein by this reference.

TECHNICAL FIELD

The invention relates to a process for separating mixtures of solids based on their densities. The present invention also relates to the use of a separating liquid (L) for separating plastic solids from metal-containing solids based on their densities, wherein the separating liquid (L) is a fluorinated fluid and has a density d3 such that $1.5<d3<2.0$; wherein the solids have a particle size ranging from 0.1 to 100 mm.

BACKGROUND ART

Plastics generally present a set of properties which make them valuable for a broad range of products. Products made out of plastics are notably lightweight, durable and corrosion resistant, and these properties make them most valuable in many applications, for example mobile electronic device. Because they are widely used, plastics now represent an important proportion of the waste stream but, unfortunately, only a minor percentage of plastic is recycled, notably due to the lack of available process to recover recyclable plastics from mixtures.

When recovering recyclable products from mixtures of components, separation and grading are the first processing stages. Mixtures containing different types of components have to be classified in separation processes. A method consisting in manual separation and grading is generally used, but is long and costly.

DE-A-3800204 describes a separation process for plastics waste using the sink-float technique, based on the different relative densities of the different types of plastic. The sorting takes place in a liquid medium having a predetermined relative density, the heavier parts then sinking and the lighter parts floating so that they can be removed separately. This sorting method can be repeated by the use of a plurality of liquid media of graded relative densities. The particles removed at the top then pass via a drying drum to the filling station. As separating agents, aqueous salt solutions and specific organic liquids are generally indicated.

The process of the invention offers a process for separating at least two components in a mixture, using a density separation approach.

WO 83/02281 A1 relates to a process for non-destructive separation of mixtures containing plastics scrap and scrap metals or glass or mixtures thereof which comprises separation of a mixture of finely divided plastic and metal or glass scrap materials or mixtures thereof in a sedimented and a non-sedimented fraction by means of a liquid separating medium. This document most specifically describes the use of halogenated aliphatic hydrocarbons mediums of the freon type. However, freon is a chlorofluorocarbon (CFC) that has been linked to ozone depletion. Additionally, according to this document, fluoro-substituted hydrocarbons have too low boiling points to be used in such separation process.

DD 293 742 A5 relates to relates to the separation of copper from wastes of printed circuit board production. The liquid is preferably a mixture of bromoform and chloroform.

SUMMARY OF INVENTION

An aspect of the present disclosure is directed to a process for separating mixtures of solids based on their densities, comprising:
a) bringing a mixture of at least two solids having two distinct densities d1 and d2, into contact with a separating liquid (L) having a density d3, distinct from d1 and d2, and wherein the solids have a particle size ranging from 0.1 to 100 mm;
b) separating floating solids from sinking solids by a density separation;
c) optionally repeating steps a) and b).

The applicant has found that the use of certain separating liquids (L) based on their density and their inability to dissolve or swell the solid(s) to be recycled, allows to separate mixtures of solids, for example plastics from metal-containing components, using a density separation approach.

According to the invention, the separating fluid (L) is a fluorinated fluid selected from the group consisting of fluorinated polyethers, fluorinated alkyl polymers, fluorinated heteroalkyl polymers and hydrofluoroethers (HFE). According to a preferred embodiment, the separating fluid (L) is a fluorinated fluid comprising at least one fluoropolyether (PFPE) chain. PFPE fluids are commercially available as Galden® PFPE and as Fomblin® from Solvay Specialty Polymers USA, L.L.C, as Krytox™ from Dupont, and as Demnum® from Daikin Industries, Ltd.

Another aspect of the present disclosure is directed to the use of a separating liquid (L) for separating plastic solids from metal-containing solids based on their densities,
wherein the separating liquid (L) has a density d3 such that $1.5<d3<2.0$;
wherein the solids have a particle size ranging from 0.1 to 100 mm.

DESCRIPTION OF EMBODIMENTS

The object of the invention is to enable separation of mixtures of at least two solids having distinct densities, in order to enable their recycling. According to the invention, this object is achieved by a process, in which the solids mixture having a particle size in the range of 0.1 to 100 mm is brought into contact with at least one separating liquid (L) of a selected density, which allows the physical separation of the solids according to their density. When submersed in the separating liquid/fluid (for example a fluorinated fluid), the lower density solid floats to the top of fluid and the higher density solid sinks to the bottom. The floating and/or sinking solid can then be removed and recycled.

The invention is based on the identification of specific separating liquids (L) selected according to their density and their inability to dissolve or swell the solid(s) to be recycled.

More precisely, the present invention relates to a process for separating mixtures of solids based on their densities, comprising:
a) bringing a mixture of at least two solids having two distinct densities d1 and d2, into contact with at least one separating liquid (L) having a density d3, distinct from d1 and d2, where $d1<d3<d2$, wherein the solids have a particle size ranging from 0.1 to 100 mm;

b) separating floating solids from sinking solids by a density separation;
c) optionally repeating steps a) and b). The density d3 preferably ranges between 1.5 and 2.0, for example between 1.55 and 1.9 or between 1.56 and 1.8. Examples of separating liquid (L) having such a density are fluorinated fluids, for example selected from the group consisting of fluorinated polyethers, fluorinated alkyl polymers, fluorinated heteroalkyl polymers and hydrofluoroethers (HFE). With the separating liquid (L) in the density range indicated above, plastic solids can be separated from metal-containing solids.

The process of the present invention is more preferably directed to the separation at least one plastic solid from at least one metal-containing solid, in view of the recycling of at least one of the components, preferably both.

Plastic Component

According to an embodiment, the plastic solid is filled or unfilled. The plastic solid may comprise one plastic component or several. The plastic solid may for example comprise at least one component selected from the group consisting of cellulose acetate, cellulose butyrate, cellulose propionate, ethylene vinyl acetate (EVA), polyamides (for example PA 6,6, PA 6, PA 6,10, PA 6,12, PA 11, PA 12), polybutylene (PB), polycarbonate (PC), poly(carbonate/ester), polyethylene terephthalate glycol (PETG), glycol modified copolyester (PCTG), polybutylene terephthalate (PBT), polyethylene terephthalate (PET), copolyester PBT/PET, polyetherimide (PEI), low-density polyethylene (LDPE), medium-density polyethylene (MDPE), High-density polyethylene (HDPE), polyphenylene oxide/polystyrene (PPO/PS), polyarylene sulfide (PAS), polypropylene (PP), polystyrene (PS), polyaryl ether sulfone (PAES), polyaryl ether ketone (PAEK), polyurethane (PU), polyvinylchloride (PVC), polyvinyl difluoride (PVDF), styrene-acrylonitrile (SAN) and thermoplastic elastomers (T/P elastomers). Preferably the plastic solid comprises at least one polyaryl ether sulfone (PAES), at least one polyarylene sulphide (PAS) and or at least one polyaryl ether ketone (PAEK).

If the polymer is a PAEK, it is preferably a poly(ether ether ketone) (PEEK), a poly(ether ketone ketone) (PEKK), a poly(ether ketone) (PEK) or a copolymer of PEEK and poly(diphenyl ether ketone) (PEEK-PEDEK copolymer). If the polymer is a PAES, it is preferably a polyphenylsulfone (PPSU), a polyethersulfone (PES) or a polysulfone (PSU). If the polymer is a PAS, it is preferably a poly(para-phenylene sulfide) (PPS). These polymers are well-described in the literature.

The plastic solid may comprises other components besides the polymer material.

According to an embodiment, the plastic solid comprises from 0 to 50 wt. % of fillers, for example mineral fillers, carbon glass or glass fibers, and/or at least one additional component, for example selected from the group consisting of colorants, lubricants, plasticizers, flame retardants, nucleating agents and stabilizers, based on the total weight of the plastic solid. The plastic solid may for example comprise less than 40 wt. %, less than 30 wt. %, less than 20 wt. %, less than 10 wt. % or even less than 5 wt. % of at least one colorant, lubricant, plasticizer, flame retardant, nucleating agent or stabilizer, based on the total weight of the plastic solid.

According to certain embodiments, the plastic solid has a density as follows: d1<1.5, preferably d1<1.4, even more preferably d1<1.3.

Metal-Containing Component

The metal-containing solid may be partially or fully composed of metal. According to an embodiment, the metal-containing solid consists essentially in metal. In other words, in this case, metal-containing solid contains less than 1 wt. % of other components, for example selected from the group consisting of colorants, lubricants, plasticizers, flame retardants, nucleating agents and stabilizers, based on the total weight of the metal-containing solid. Alternatively, the metal-containing solid contains less than 0.8 wt. % of other components, less than 0.5 wt. %, less than 0.3 wt. % or even less than 0.1 wt. %, based on the total weight of the metal-containing solid.

According to an embodiment, the metal in the metal-containing solid is selected from the group consisting of cast iron, carbon steel, manganese steel, chrome steel, chromium-nickel steel, stainless steel, copper, brass, tin bronze, aluminium, titanium, titanium alloys and magnesium.

According to certain embodiments, the metal-containing solid has a density as follows: d2>2.0, preferably d2>2.5, even more preferably d2>3.0.

Separating Liquid (L)

The separating liquid (L) used in the process of the present invention is selected according to its density and its inability to dissolve the solid(s) to be recycled.

The density (d3) of the separating fluid (L) is distinct from the densities of the solids (d1, d2) to be separated according to this process. More precisely, the separating liquid (L) is selected in order for its density d3 to range between d1 and d2. Accordingly, the density d3 is as follows:

$$d1<d3<d2$$

wherein d3 is the density of the separating fluid, and d1 and d2 are the densities of the at least two solids to be separated.

According to certain embodiments, the separating liquid (L) has a density as follows: 1.5<d3<2.0, preferably 1.55<d3<1.9, even more preferably 1.56<d3<1.8.

According to certain embodiments, the separating liquid (L) has a viscosity lower than 100 centipoise (cP) or 0.1 Pa·s at room temperature, preferably lower than 90 cP.

The separating liquid (L) used in the process of the present invention is a fluorinated fluid. It is preferably a fluorinated polyether, a fluorinated alkyl polymer, a fluorinated heteroalkyl polymer and/or a hydrofluoroether (HFE).

Several separating liquids (L) of different chemical nature can be used in the process of the present invention. For example, a diluent can be used in order to offset the cost of the separating process.

Fluorinated Polyether

The separating liquid (L) may notably be a fluorinated polyether.

According to another embodiment, the separating liquid (L) is a fluorinated polyether comprising at least one fluoropolyether (PFPE) chain, also called "(per)fluoropolyether".

The fluoropolyether (PFPE) chain (or backbone) of the fluorinated polymer may advantageously be according to formula (I):

$$-[(CFX_1)_aO(R_f)(CFX_2)_b]- \quad (I)$$

wherein:
a and b, independently from each other, are integer equal to at least 1;
$X_1$ and $X_2$, independently form each other, are F or $CF_3$, provided that when a and/or b are higher than 1, $X_1$ and $X_2$ are F;
$(R_f)$ comprises repeating units being independently selected from the group consisting of:

(i) —CFX$_1$O—, wherein X$_1$ is F or CF$_3$;
(ii) —CFX$_1$CFX$_1$O—, wherein X$_1$, equal or different at each occurrence, is F or CF$_3$, with the proviso that at least one of X$_1$ is F;
(iii) —CF$_2$CF$_2$CW$_2$O—, wherein each W is independently from each other, F, Cl or H;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_f$-T, wherein R$_f$ is a fluoropolyoxyalkene chain comprising 0 to 10 recurring units selected from the group consisting of CFX$_1$O, CF$_2$CFX$_1$O, CF$_2$CF$_2$CF$_2$O, CF$_2$CF$_2$CF$_2$CF$_2$O, wherein each X$_1$ is independently from each other F or CF$_3$ and T is a C$_1$-C$_3$ perfluoroalkyl group.

Preferably, a and b, independently form each other, are integer 1 to 10, even more preferably from 1 to 3.

The fluoropolyether (PFPE) chain (or backbone) of the fluorinated polymer may advantageously be according to formula (II):

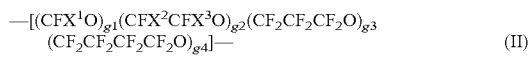

$$—[(CFX^1O)_{g1}(CFX^2CFX^3O)_{g2}(CF_2CF_2CF_2O)_{g3}(CF_2CF_2CF_2CF_2O)_{g4}]— \quad (II)$$

wherein
X$^1$ is, independently at each occurrence, F or CF$_3$,
X$^2$ and X$^3$, independently from each other and at each occurrence, are F or CF$_3$, with the proviso that at least one of X is F;
g1, g2, g3, and g4, independently from each other, are integers ≥0, such that the sum (g1+g2+g3+g4) is from 2 to 300, preferably from 2 to 100; should at least two of g1, g2, g3 and g4 be different from zero, the different recurring units are generally statistically distributed along the chain.

The fluoropolyether (PFPE) chain (or backbone) of the fluorinated polymer may advantageously be according to formula (III):

$$[(CF_2O)_n(CF_2CF_2O)_m]_p \quad (III)$$

wherein:
n and m, independently from each other, are integers ≥0;
the number average molecular weight (Mn) of the chain ranges between 400 and 10,000, preferably between 400 and 5,000;
both m and n are preferably >0,
the ratio m/n preferably ranges between 0.1 and 10, for example 0.5 and 10.

The fluoropolyether (PFPE) chain (or backbone) of the fluorinated polymer may advantageously be according to formula (IV):

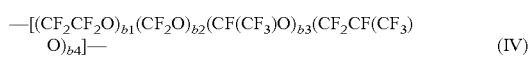

$$—[(CF_2CF_2O)_{b1}(CF_2O)_{b2}(CF(CF_3)O)_{b3}(CF_2CF(CF_3)O)_{b4}]— \quad (IV)$$

wherein:
b1, b2, b3, b4, independently from each other, are integers ≥0,
the number average molecular weight (Mn) of the chain is between 400 and 10,000, preferably between 400 and 5,000;
preferably b1 is 0, and b2, b3, b4 are >0, with the ratio b4/(b2+b3) being ≥1.

The fluoropolyether (PFPE) chain (or backbone) of the fluorinated polymer may advantageously be according to formula (V):

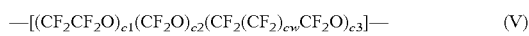

$$—[(CF_2CF_2O)_{c1}(CF_2O)_{c2}(CF_2(CF_2)_{cw}CF_2O)_{c3}]— \quad (V)$$

wherein:
cw is 1 or 2;
c1, c2, and c3 independently from each other, are integers ≥0,
the number average molecular weight (Mn) of the chain is between 400 and 10,000, preferably between 400 and 5,000;
preferably c1, c2 and c3 are all >0, with the ratio c3/(c1+c2) being generally lower than 0.2.

The fluoropolyether (PFPE) chain (or backbone) of the fluorinated polymer may advantageously be according to formula (VI):

$$—[(CF_2CF(CF_3)O)_d]— \quad (VI)$$

wherein:
d is an integer >0,
the number average molecular weight (Mn) of the chain is between 400 and 10,000, preferably between 400 and 5,000.

The fluoropolyether (PFPE) chain (or backbone) of the fluorinated polymer may advantageously be according of formula (VII):

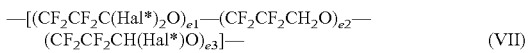

$$—[(CF_2CF_2C(Hal^*)_2O)_{e1}—(CF_2CF_2CH_2O)_{e2}—(CF_2CF_2CH(Hal^*)O)_{e3}]— \quad (VII)$$

wherein:
Hal*, equal or different at each occurrence, is a halogen selected from fluorine and chlorine atoms, preferably a fluorine atom;
e1, e2, and e3, independently from each other, are integers ≥0, such that the sum (e1+e2+e3) sum is from 2 and 300.

According to a preferred embodiment, the separating liquid (L) is a fluorinated polyether comprising one chain (or backbone) as defined above and two chain ends, wherein at least one chain end bears an hydroxy group or a neutral group. According to an even preferred embodiment, both chain ends bear an hydroxy group or a neutral group. Neutral end groups are fluorinated alkylene chains comprising 1 to 6 carbon atoms. Neutral end groups can for example be CF$_3$ or CF$_2$CF$_3$.

According to a preferred embodiment, the separating liquid (L) is a fluorinated polyether of formula (VIII):

$$CF_3CF_2—O\text{-chain-}O—CF_2CF_3 \quad (VIII),$$

wherein "chain" is according to any one of formulas (I) to (VII).

According to another preferred embodiment, the separating liquid (L) is a fluorinated polyether of formula (IX):

$$HOCF_2—O\text{-chain-}O—CF_2OH \quad (IX),$$

wherein "chain" is according to any one of formulas (I) to (VII).

PFPE fluids are commercially available as Galden® PFPE and as Fomblin® from Solvay Specialty Polymers USA, L.L.C, as Krytox™ from Dupont, and as Demnum® from Daikin Industries, Ltd.

Fluorinated Alkyl

The separating liquid (L) may notably be a fluorinated alkyl polymer.

The term "fluorinated alkyl" refers to a linear, branched or cyclic hydrocarbon chain in which some or all of the hydrogen atoms are replaced by fluorine atoms. The term "fluorinated alkyl" may include fluorinated alkyl or fluorinated heteroalkyl that are optionally substituted by halogen or hydroxyl groups or that are optionally unsaturated.

According to an embodiment of the present invention, the separating liquid (L) is a fluorinated alkyl and its chain (or backbone) comprises from 1 to 20 carbon atoms, from 2 to 15 carbon atoms or from 3 to 10 carbon atoms.

According to an embodiment of the present invention, the chain (or backbone) of the separating liquid (L) is $(CF_2)x$ wherein x is from 0 to 20.

In a preferred embodiment, the chain (or backbone) of the separating liquid (L) is a C4-C10 fluorinated alkyl. Examples of preferred C4-C10 fluorinated alkyl according to the invention are $-C(CF_3)_2-$, $-C_4F_8-$ or $-C_2F_4-$.

According to a preferred embodiment, the separating liquid (L) is a fluorinated alkyl polymer comprising one chain (or backbone) as defined above and two chain ends, wherein at least one chain end bears an hydroxy group or a neutral group, for example $CF_3$ or $CF_2CF_3$. According to an even preferred embodiment, both chain ends bear an hydroxy group or a neutral group, for example $CF_3$ or $CF_2CF_3$.

Fluorinated alkyl polymers are commercially available as Opteon® from Chemours.

Fluorinated Heteroalkyl

The separating liquid (L) may notably be a fluorinated heteroalkyl polymer.

The term "fluorinated heteroalkyl" refers to a linear, branched or cyclic hydrocarbon chain comprising one or more heteroatoms, for example O or S, preferably O, in which some or all of the hydrogen atoms are replaced by fluorine atoms.

The term "fluorinated heteroalkyl" may include fluorinated alkyl or fluorinated heteroalkyl that are optionally substituted by halogen or hydroxyl groups or that are optionally unsaturated.

According to an embodiment of the present invention, the separating liquid (L) is a fluorinated heteroalkyl and its chain (or backbone) comprises:
- from 1 to 20 carbon atoms, from 2 to 15 carbon atoms or from 3 to 10 carbon atoms, and
- from 1 to 10 heteroatoms, from 1 to 5 heteroatoms or from 1 to 3 heteroatoms, for example O or S, preferably O.

According to a preferred embodiment, the separating liquid (L) is a fluorinated heteroalkyl polymer comprising one chain (or backbone) as defined above and two chain ends, wherein at least one chain end bears an hydroxy group or a neutral group, for example $CF_3$ or $CF_2CF_3$. According to an even preferred embodiment, both chain ends bear an hydroxy group or a neutral group, for example $CF_3$ or $CF_2CF_3$.

Fluorinated heteroalkyl are commercially available as Opteon® from Chemours and as Novec® from 3M.

Hydrofluoroethers (HFE)

The separating liquid (L) may notably be a hydrofluoroether (HFE), for example an aromatic HFE of formula (X) or an aliphatic HFE of formula (XI).

HFE fluids may be of formula (X):

$$Ph(OR_f)_x \quad (X)$$

wherein
Ph is an aromatic ring linked to one or more ether groups $-OR_f$, preferably Ph is a 6C atoms ring,
$R_f$:
- is a monovalent fluorinated alkyl group comprising at least one C—F bond,
- has a carbon chain, preferably a $C_1$-$C_{10}$ carbon chain, which can be linear or can comprise branches and/or cycles, and, optionally, can comprise in chain heteroatoms selected from O, N or S, and
- when x>1, the $R_f$ groups on the same molecule can be equal to or different from each other.

Preferably, x equals 1, 2, 3 or 4, more preferably x equals 2 and 3, even more preferably x equals 2.

Each $R_f$ group has preferably a $C_1$-$C_{10}$, more preferably a $C_2$-$C_6$ carbon chain which can be linear or comprise branches and/or cycles. The carbon chain may optionally include heteroatoms for example selected from O, N or S; preferably O.

Each $R_f$ group comprises at least one C—F bond, and preferably each $R_f$ group also comprises at least one C—H bond. More preferably, each $R_f$ is a fluorinated alkyl group with one single C—H bond, even more preferably wherein said single C—H bond is on the carbon atom in position 2 of the carbon chain.

When the Ph is an aromatic 6C atoms ring, x are bonded to $-OR_f$ groups and (6-x) can be bonded to any type of substituents, preferably they are bonded to H atoms or to F atoms, more preferably H atoms.

HFE of formula (X) can be prepared by reacting mono or polyhydric phenols with fluorinated olefins, preferably fully fluorinated olefins. The Ph-OH group adds to the double C=C bond and the H atom adds on the C atom in position 2. The resulting compound is a thus hydrofluoroether. This hydrofluoroether can be further fluorinated to a perfluoroether, but preferably is used as a hydrofluoroether, as already mentioned above.

HFE of formula (X) can be selected in the following group:
1,4-bis(1,1,2,2-tetrafluoroethoxy)benzene of formula $(X_1)$

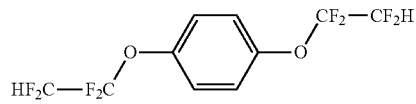

1,4-bis(2-trifluoromethyl-1,1,2-trifluoroethoxy)benzene of formula $(X_2)$:

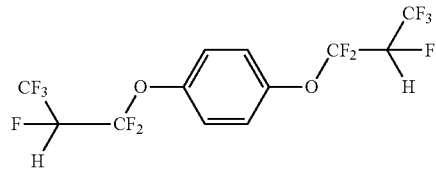

their corresponding ortho- and meta-isomers:
1,3-bis(1,1,2,2-tetrafluoroethoxy)benzene $(X_3)$,
1,3-bis(2-trifluoromethyl-1,1,2-trifluoroethoxy)benzene $(X_4)$,
1,2-bis(1,1,2,2-tetrafluoroethoxy)benzene $(X_5)$,
1,2-bis(2-trifluoromethyl-1,1,2-trifluoroethoxy)benzene $(X_6)$, their corresponding derivatives of perfluoromethylvinylether with catechol, resorcinol and hydroquinone:
1,2-bis(2-trifluoromethoxy-1,1,2-trifluoroethoxy)benzene $(X_7)$,
1,3-bis(2-trifluoromethoxy-1,1,2-trifluoroethoxy)benzene $(X_8)$,
1,4-bis(2-trifluoromethoxy-1,1,2-trifluoroethoxy)benzene $(X_9)$.

HFE fluids of formula (X) are described in copending European patent application 18214418.8 filed on Dec. 20, 2018, incorporated herein by reference.

HFE fluids may be of formula (XI):

$$R_g-O-R_h-O-R_{g'} \quad (XI)$$

wherein
- $R_g$ and $R_{g'}$ are, independently from each other, a fluoroaliphatic group,
- each $R_g$ and $R_{g'}$ contain 1H atom;
- $R_h$ is a linear, branched or cyclic alkylene group having from 2 to about 8 C atoms and at least 4H atoms.

HFE fluids of formula (XI) are described in U.S. Pat. No. 7,128,133, incorporated herein by reference.

Process Steps

The process is advantageously continuous. In that case, steps a) and b) of the process are repeated.

According to the invention, the solids have a particle size ranging from 0.1 to 100 mm. The preferred range of particle size is 0.5 to 80 mm.

According to certain embodiments, the charge of solids to be separated according to the process is less than 50 volume percent (V.%), preferably less than 30 V.%, even more preferably less than 20 V.%, based on the total volume in the container.

As already stated, the process may be implemented in such a way that the floating solid is removed after contact with the separating liquid (L). Implementation of the process according to the invention is however also possible when the sinking solid is removed after contact with the separating fluid.

The process of the invention takes place in any kind of receptacles, containers or vessels, called herein separation container (C). The process preferably takes place in a separation container (C) allowing the addition/removal of the separating liquid (L) when needed.

According to an embodiment, the mixture of solids to be separated is charged into the separation container (C). Then, the mixture of solids is brought into contact with the separating liquid (L) by addition of the liquid (L) in the separation container and gravity separation of the solids takes place.

According to another embodiment, the separating liquid (L) is charged into the separation container (C). Then, the mixture of solids is added in the container (C). Gravity separation of the solids can then take place.

The contact between the solids and the liquid (L) may be improved by means for agitation, for example mechanical stirring, vibration, sonication, and bubble-induced agitation. The container (C) may be equipped with additional pieces, for example skimming device or debris traps, in order to facilitate the removal of the component(s) to be separated.

The contact of the solids with the separating liquid (L) preferably takes place at a temperature ranging from the freezing point and the boiling point of the separating liquid (L), for example between 10° C. and 50° C., preferably between 15° C. and 40° C., even more preferably at room temperature.

The process of the invention (notably a cycle of steps a) and b) when the process is continuous) is generally less than 20 minutes, for example less than 15 minutes.

According to an embodiment, the process comprises a step consisting in removing floating solids after contact with the separating liquid (L) and drying the solids.

According to an embodiment, after the step of removing the solids to be recycled, the process comprises an additional step consisting in recovering part of the separating liquid (L) which may have remained with the solids, by using for example a condensation step, in order for example to reintroduce the recycled separating liquid (L) into the process of the invention.

In a process variant, the present invention relates to a process for separating mixtures of solids based on their densities, comprising:

a) bringing a mixture of at least two solids having two distinct densities d1 and d2, into contact with a first liquid (L1) having a density d4 in a container, wherein the solids have a particle size ranging from 0.1 to 100 mm;

a') pouring at least one second liquid (L2) having a density d5 in the container, until the density of the liquid in the container reaches a density d3 which allows the separation of the solids based on their density;

b) separating floating solids from sinking solids by a density separation;

c) optionally repeating steps a), a') and b).

According to this variant, the liquid in the container reaches a density d3 which allows the separation of the solids based on their density, the liquid being also called hereby the separating liquid (L). After step b), the separating liquid (L) may be adjusted to a new density, for example back to density d4 or totally removed (step b')).

Applications

The present invention also relates to the use of a separating liquid (L) for separating plastic solids from metal-containing solids based on their densities,
- wherein the separating liquid (L) has a density d3 such that 1.5<d3<2.0;
- wherein the solids have a particle size ranging from 0.1 to 100 mm;
- wherein the plastic solids are filled or unfilled and selected from the group consisting of cellulose acetate, cellulose butyrate, cellulose propionate, ethylene vinyl acetate (EVA), polyamides (for example PA 6,6, PA 6, PA 6,10, PA 6,12, PA 11, PA 12), polybutylene (PB), polycarbonate (PC), poly(carbonate/ester), polyethylene terephthalate glycol (PETG), glycol modified copolyester (PCTG), polybutylene terephthalate (PBT), polyethylene terephthalate (PET), copolyester PBT/PET, polyetherimide (PEI), low-density polyethylene (LDPE), medium-density polyethylene (MDPE), High-density polyethylene (HDPE), polyphenylene oxide/polystyrene (PPO/PS), polyphenylene sulfide (PPS), polypropylene (PP), polystyrene (PS), polyaryl ether sulfone (PAES), polyurethane (PU), polyvinylchloride (PVC), polyvinyl difluoride (PVDF), styrene-acrylonitrile (SAN) and thermoplastic elastomers (T/P elastomers), and
- wherein the metal solids are selected from the group consisting of cast iron, carbon steel, manganese steel, chrome steel, chromium-nickel steel, stainless steel, copper, brass, tin bronze, aluminum, titanium, titanium alloys and magnesium.

All the embodiments described above apply to the present section. Notably, the separating liquid (L) may be a fluorinated fluid comprising at least one fluoropolyether (PFPE) chain. Additionally, the separating liquid (L) may be a fluorinated fluid comprising at least one fluoropolyether (PFPE) chain of formula (III):

$$[(CF_2O)_n(CF_2CF_2O)_m]_p \qquad (III)$$

wherein:
- n and m, independently from each other, are integers ≥0, the number average molecular weight (Mn) of the chain is between 400 and 10,000.

both m and n are preferably different from zero, with the ratio m/n being preferably comprised between 0.1 and 10, for example 0.5 and 10.

Should the disclosure of any patents, patent applications, and publications which are incorporated herein by reference conflict with the description of the present application to the extent that it may render a term unclear, the present description shall take precedence.

The invention will be disclosed in greater detail by means of the following experimental section.

EXAMPLES

Raw Materials
  Aluminium from American Elements—density 2.0-2.9
  Stainless steel from American Elements—density 7.0-9.0
  Radel® PPSU from Solvay Specialty Polymers USA—density 1.30
  KetaSpire® PEEK from Solvay Specialty Polymers USA—density 1.30
  Novec® 7500 from 3M—density 1.61
  Galden® SV55 from Specialty Polymers Italy Spa—density 1.65

Example 1 (Inventive)

A feedstock containing aluminium shavings and PPSU was separated and recovered using the following method. A mixture of aluminium and plastic having a particle size distribution ranging from 0.1 and 10 mm was added to a 60 mL-vessel, then 40 mL of Novec® 7500 was poured.

The plastic portion was skimmed from the top and dried in a vacuum oven (−20 in. Hg) overnight at 100° C. After drying, the plastic was analysed by TGA and DSC. No change was observed in thermal decomposition temperature or thermal transitions.

Example 2 (Inventive)

A feedstock containing stainless shavings and PEEK was separated and recovered using the following method. A mixture of aluminium and plastic having a particle size distribution ranging from 0.1 and 10 mm was added to a 60 ml-vessel, then 40 mL of Galden® SV55 was poured.

The plastic portion was skimmed from the top and dried in a vacuum oven (−20 in. Hg) overnight at 100° C. After drying, the plastic was analysed by TGA and DSC. No change was observed in thermal decomposition temperature or thermal transitions.

Example 3 (Inventive & Comparative)

PPSU pellets were added to a 60 mL-vessel, then 40 mL of one of the following four solvents was poured:
  Galden® (density=1.65 g/cm³)
  Chloroform (density=1.49 g/cm³)
  1,2-dichloroethane (density=1.25 g/cm³)
  1,1,2,2-tetrachloroethane (density=1.59 g/cm³)

Almost immediate changes were observed with all three chlorinated fluids (chloroform, 1,2-dichloroethane, and 1,1,2,2-tetrachloroethane), while no change was observed with Galden®. After 2 hours of exposure, the chlorinated solvents had clearly dissolved/swelled with pellets.

The invention claimed is:

1. A process for separating mixtures of solids based on their densities, comprising:

a) bringing a mixture of at least one plastic solid and at least one metal-containing solid having two distinct densities d1 and d2, into contact with a separating liquid (L) having a density d3, distinct from d1 and d2, wherein 1.5<d3<2.0, wherein the separating fluid (L) is a fluorinated fluid selected from the group consisting of fluorinated polyethers, fluorinated alkyl polymers, and fluorinated heteroalkyl polymers and wherein the solids have a particle size ranging from 0.1 to 100 mm;

b) separating the at least one plastic solid from the at least one metal-containing solid by a density separation;

c) optionally repeating steps a) and b).

2. The process according to claim 1, wherein the plastic solid is filled or unfilled and comprises at least one component selected from the group consisting of cellulose acetate, cellulose butyrate, cellulose propionate, ethylene vinyl acetate (EVA), polyamides, polybutylene (PB), polycarbonate (PC), poly(carbonate/ester), polyethylene terephthalate glycol (PETG), glycol modified copolyester (PCTG), polybutylene terephthalate (PBT), polyethylene terephthalate (PET), copolyester PBT/PET, polyetherimide (PEI), low-density polyethylene (LDPE), medium-density polyethylene (MDPE), High-density polyethylene (HDPE), polyphenylene oxide/polystyrene (PPO/PS), polyphenylene sulfide (PPS), polypropylene (PP), polystyrene (PS), polyaryl ether sulfone (PAES), polyaryl ether ketone (PAEK), polyurethane (PU), polyvinylchloride (PVC), polyvinyl difluoride (PVDF), styrene-acrylonitrile (SAN) and thermoplastic elastomers (T/P elastomers).

3. The process according to claim 1, wherein the plastic solid comprises at least one polyaryl ether sulfone (PAES) and or at least one polyaryl ether ketone (PAEK).

4. The process according to claim 1, wherein the metal-containing solid is selected from the group consisting of cast iron, carbon steel, manganese steel, chrome steel, chromium-nickel steel, stainless steel, copper, brass, tin bronze, aluminium, titanium, titanium alloys and magnesium.

5. The process according to claim 1, wherein the separating fluid (L) is a fluorinated fluid comprising at least one fluoropolyether (PFPE) chain.

6. The process according to claim 1, wherein the separating fluid (L) is a fluorinated fluid comprising at least one fluoropolyether (PFPE) chain of formula (III):

$$[(CF_2O)_n(CF_2CF_2O)_m]p \qquad (III)$$

wherein:
n and m, independently from each other, are integers ≥0, the number average molecular weight (Mn) of the chain is between 400 and 10,000.

7. The process according to claim 6, wherein formula (III) is such that m and n are both integers >0, and the ratio m/n ranges between 0.1 and 10.

8. The process according to claim 1, wherein the separating fluid (L) has a density as follows: 1.55<d3<1.9.

9. The process according to claim 1, further comprising removing floating solids after contact with the separating liquid (L) and drying the solids.

10. The process according to claim 2, wherein the plastic solid comprises at least one polyamide selected from the group consisting of PA 6,6, PA 6, PA 6,10, PA 6,12, PA 11, PA 12.

11. The process according to claim 7, wherein the ratio m/n ranges between 0.5 and 10.

* * * * *